United States Patent [19]

Siewick

[11] Patent Number: 5,072,120
[45] Date of Patent: Dec. 10, 1991

[54] ELECTROMAGNETIC IMAGER DEVICE

[76] Inventor: Joseph T. Siewick, 613-B Persimmon La., Shepherdstown, W. Va. 25443

[21] Appl. No.: 308,416

[22] Filed: Feb. 9, 1989

[51] Int. Cl.$^5$ .............................. G01J 5/00; G01J 5/58
[52] U.S. Cl. ..................................... 250/330; 250/331
[58] Field of Search ...................... 250/330, 331, 338.2

[56] References Cited

U.S. PATENT DOCUMENTS

| | | | |
|---|---|---|---|
| 3,479,510 | 11/1969 | Baumberger et al. | 250/330 |
| 3,748,471 | 7/1973 | Ross et al. | 250/333 |
| 4,262,198 | 4/1981 | Gupta et al. | 250/340 |
| 4,275,302 | 6/1981 | Imbert et al. | 250/330 |
| 4,306,150 | 12/1981 | Dietz | 250/332 |
| 4,468,136 | 8/1984 | Murphy et al. | 374/45 |
| 4,634,870 | 1/1987 | Metcalf | 250/332 |
| 4,666,296 | 5/1987 | Bailly-Salins | 356/28.5 |
| 4,788,428 | 11/1988 | Metcalf et al. | 250/332 |

FOREIGN PATENT DOCUMENTS

| | | |
|---|---|---|
| 664362 | 1/1952 | United Kingdom . |
| 930355 | 7/1963 | United Kingdom . |
| 942639 | 11/1963 | United Kingdom . |
| 1325752 | 8/1973 | United Kingdom . |

OTHER PUBLICATIONS

Christopher C. Davis and Samuel J. Petuchowski, "A New Thermal Radiation Detector Using Optical Heterodyne Detection of Absorbed Energy", *Infrared Physics*, vol. 23, No. 4 (1983) pp. 177–182; Pergamon Press Ltd.

Christopher C. Davis and Samuel J. Petuchowski, "Phase fluctuation optical heterodyne spectroscopy of gases", *Applied Optics*, vol. 20, No. 14 (Jul. 15, 1981) pp. 2539–2554; ©1981 Optical Society of America.

A. G. Rokakh, A. S. Oleinik, L. D. Zorina, V. I. Davydov, B. P. Zakharchenya and F. A. Chudnovskii, "Infrared visualizer using a CdSe-FTIROS structure", *Sov. Tech. Phys. Lett.*, vol. 5, No. 11 (Nov. 1979) [Copyright ©1980 American Institute of Physics].

*Primary Examiner*—Constantine Hannaher
*Attorney, Agent, or Firm*—William H. Holt

[57] ABSTRACT

An electromagnetic imager device can detect electromagnetic images, for example, in the infrared, millimeter and microwave wavelengths and convert these images into useful wavelengths which imaging devices, such as a camera, can record. The electromagnetic imager includes an interferometer having one arm thereof filled with a gaseous mixture. The particular gaseous mixture used, improves the accuracy of the device by enhancing the probability of an exchange of kinetic energy for molecular internal energy during molecular collision. The electromagnetic image is absorbed in an internal mode of the molecular species in the gas over an absorption depth. The absorption of the electromagnetic energy causes heating in the gas which, in turn, causes local changes in the index of refraction in the focal plane of the gas. These changes in the index of refraction phase modulate the phase front of the laser beam passing through the gas. The local index of refraction variations thus result in a direct mapping of the absorbed electromagnetic energy image allowing the image to be detected by interferometric means.

52 Claims, 6 Drawing Sheets

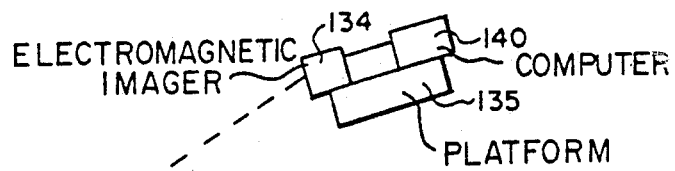
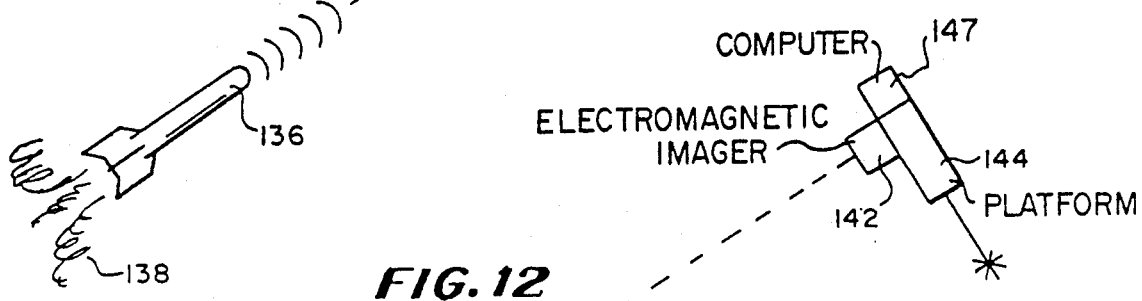
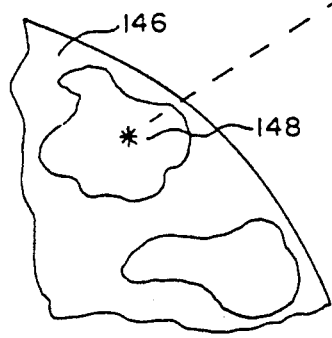
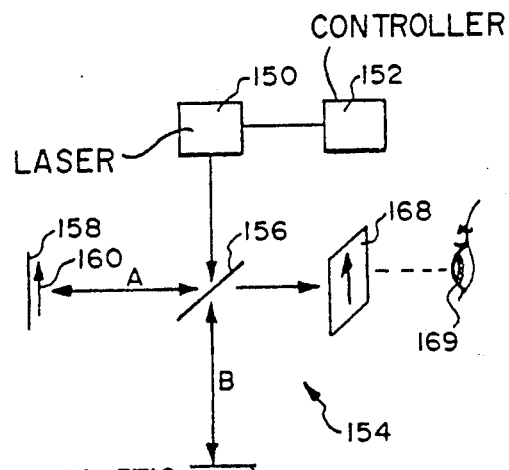
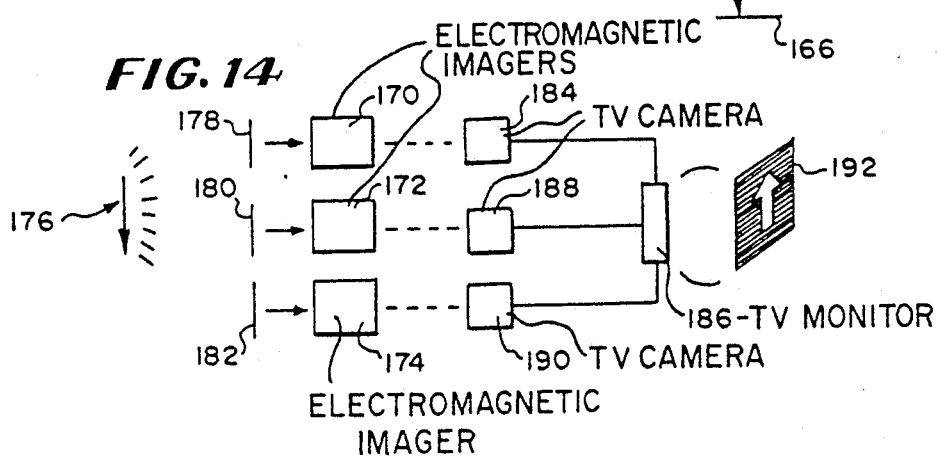

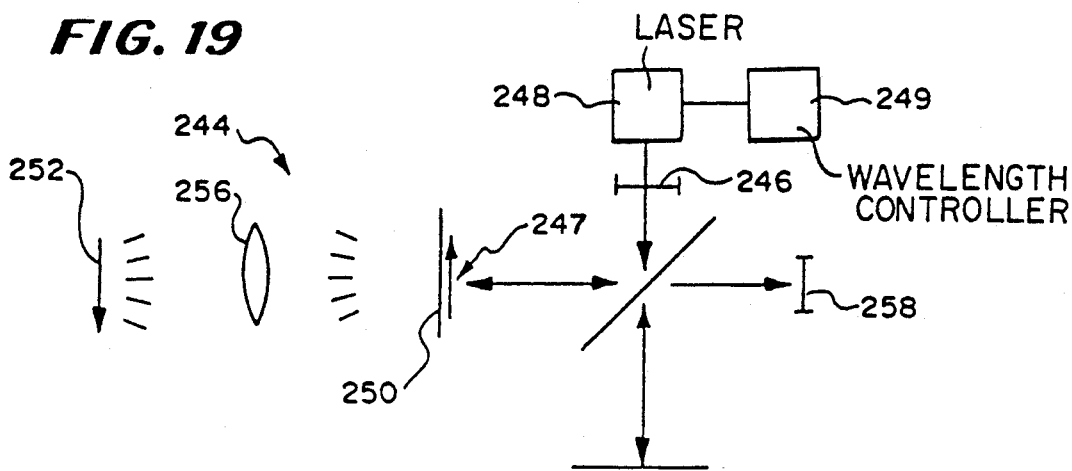
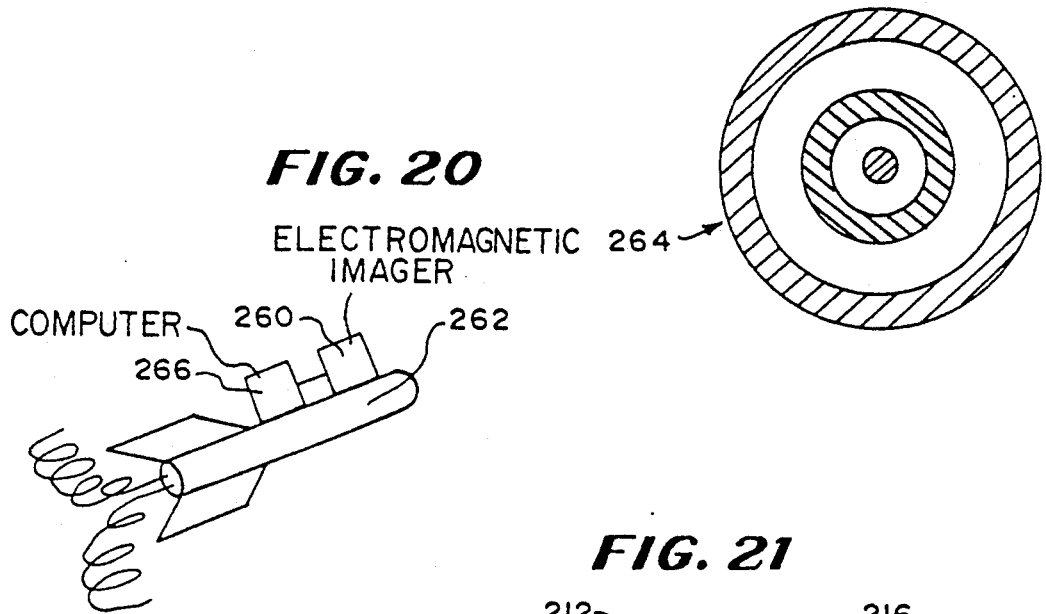
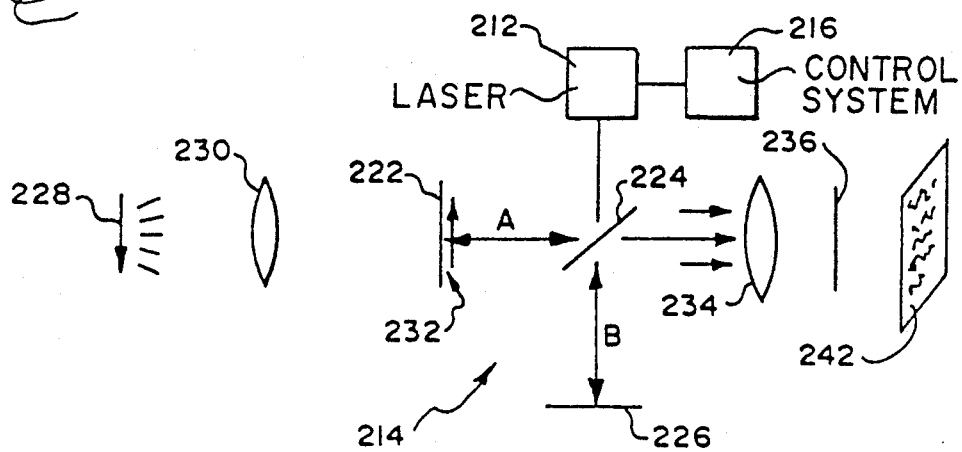

ELECTROMAGNETIC IMAGER DEVICE

FIELD OF THE INVENTION

This invention relates to an electromagnetic imaging device for detecting electromagnetic radiation using interferometric means and, more particularly, to a device for detecting electromagnetic images, such as infrared, millimeter wave and microwave images, and converting such images to visible or other useful wavelengths in the focal plane of an imaging system, such as an imaging array or a camera.

BACKGROUND OF THE INVENTION

Description of the Prior Art

Electromagnetic radiation detectors are used for detecting electromagnetic radiation of various wavelengths, such as infrared radiation, emitted from missiles, aircraft or other objects. For example, infrared detectors are used on guided missiles to direct them to infrared radiation emitting targets.

One such infrared detector is disclosed in: "A New Thermal Radiation Detector Using Optical Heterodyne Detection Of Absorbed Energy", by Christopher C. Davis and Samuel J. Petuchowski, *Infrared Physics*, Volume 23, No. 4, pages 177-182 (1983). The operation of this detector is based upon a phase fluctuation optical heterodyne (PFLOH) technique described in an article entitled: "Phase Fluctuation Optical Heterodyne Spectroscopy Of Gases", by Christopher C. Davis and Samuel J. Petuchowski, *Applied Optics*, Volume 20, No. 4, pages 2539-2554 (1981).

The detector described in the article utilizes optical heterodyne techniques to detect a small density change which occurs in a gas when it is heated in a spatially non-uniform manner by electromagnetic radiation. The heating can occur in one of two ways. Either the gas itself absorbs the input radiation to be detected directly or indirectly by heat by thermal conduction from an absorbing surface or membrane.

When a thin membrane is used, the infrared signal irradiates the membrane causing the membrane to heat up. Since the membrane is disposed relatively close to one arm of an interferometer, the membrane exchanges heat with a gas disposed in that arm of the interferometer which, in turn, causes the density of the gas close to the membrane to decrease. This decrease in the density of the gas results in a decrease in the index of refraction. The change in the index of refraction is detected by an interferometer.

Modulated radiation used to heat the gas results in density modulation of the gas which, in turn, phase modulates the single frequency laser beam passing through the gas. The resulting modulated laser beam results in the modulation frequency of the input radiation. This modulated beam is demodulated at a photodetector at the interferometer output.

Referring to FIG. 1, a reference beam A and a probe beam B are derived from the single frequency laser beam by way of a beam splitter. Reference beam A serves as a local oscillator beam and is disposed sufficiently far from the absorbing surface such that the thermal conduction only has a negligible effect on it. Probe beam B passes very close to the absorbing surface which is irradiated by a modulated input source of radiation. This irradiation leads to a temperature modulation of the gas along the path of the beam. This, in turn, results in a refractive index modulation of the gas along the path of the beam B and consequently phase modulation of the beam B. The modulated beam B is demodulated by a photodetector to provide a signal representative of the modulation frequency of the input radiation.

The radiation detectors described above are only able to quantitatively measure the amount of radiation falling upon them. This type of detector is unable to produce a two-dimensional picture of the radiation-emitting object. This device relies upon the transport of heat from the illuminated membrane to the adjacent gaseous medium.

SUMMARY OF THE INVENTION

It is an object of the present invention to provide an electromagnetic radiation detector which solves the problems associated with the prior art.

It is another object of the present invention to convert electromagnetic images at wavelengths, such as infrared, millimeter and microwave, to useful wavelengths, which can be utilized by imaging devices, such as cameras.

It is a further object of the present invention to provide an electromagnetic imager device capable of reproducing and recording images in the infrared, millimeter wave and microwave wavelengths.

It is yet a further object of the present invention to provide a gas having a molecular species which improves the accuracy of the device.

It is yet a further object of the present invention to provide a spatial light modulator for use with optical computers for feature extraction and pattern recognition.

Briefly, the present invention relates to an electromagnetic imager device for detecting electromagnetic images, for example, in the infrared, millimeter and microwave wavelengths and converting these images into useful wavelengths which imaging devices, such as a camera, can record. The electromagnetic imager includes an interferometer having one arm or both arms thereof filled with a gas. The particular gas used improves the accuracy of the device by enhancing the probability for each molecular collision of an exchange of internal energy for kinetic energy. The electromagnetic image is absorbed into internal modes of the molecular species in the gas over an absorption depth. The absorption of the electromagnetic energy causes heating in the gas which, in turn, causes local changes in the index of refraction in the focal plane of the gas. These changes in the index of refraction phase modulate the phase front of the laser beam passing through the gas. The local index of refraction variations thus result in a direct mapping of the absorbed electromagnetic energy image allowing the image to be detected by interferometric means.

DESCRIPTION OF THE DRAWING

These and other objects of the invention will be readily understood with reference to the accompanying description and drawing, wherein:

FIG. 11 is a schematic representation of an alternate embodiment of the electromagnetic imager in accordance with the present invention used to detect ballistic missile plumes;

FIG. 12 is a schematic representation of another alternate embodiment of the electromagnetic imager in accordance with the present invention used for terrestrial surveillance imaging from space;

FIG. 13 is an optical schematic representation of the electromagnetic imager in accordance with the present invention used as a night vision device;

FIG. 14 is an optical schematic representation of an alternate embodiment of the electromagnetic imager in accordance with the present invention used as a color image system;

FIG. 19 is an optical schematic representation of an alternate embodiment of an electromagnetic imager in accordance with the present invention used as a spatial light modulator;

FIG. 20 is an optical schematic representation of another alternate embodiment of the present invention used on a missile; and FIG. 21 is an optical schematic representation of another alternate embodiment of an electromagnetic imager in accordance with the present invention used to produce a Fourier transform of a thermal infrared emitting object.

DETAILED DESCRIPTION

Figure 1:
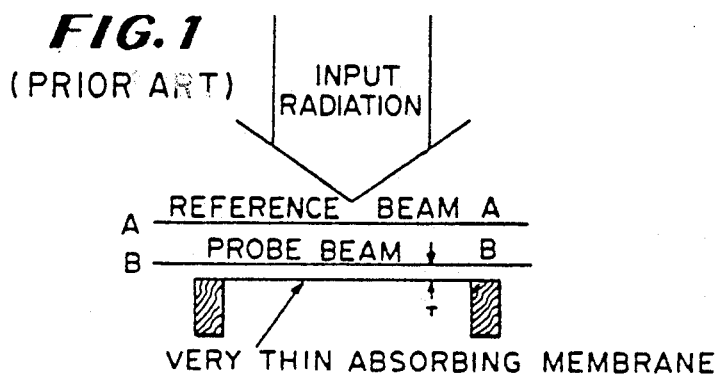
FIG. 1 is a schematic arrangement of a membrane PFLOH detector known in the art.

The electromagnetic imager in accordance with the present invention is able to detect and reproduce electromagnetic radiation images for example, in the infrared, millimeter wave and microwave portions of the electromagnetic spectrum. The electromagnetic image is converted into useful light by coherent mixing using interferometry. A gaseous medium is disposed in one leg or both legs of the interferometer. The gaseous medium absorbs the electromagnetic energy into internal modes of the molecular species over an absorption depth. The heating produced from absorption of the electromagnetic image is transferred into the gaseous medium as well as neighboring regions of the gas in the focal plane of the electromagnetic imager. This results in a consequential change in the index of refraction of the gaseous medium, adjacent the electromagnetic input window. A laser beam having a flat phase front directed through the gaseous medium adjacent the electromagnetic input window is no longer flat, but instead has the refractive index modulation transferred to a phase shift pattern across the laser beam cross-section in a point-to-point mapping. This allows the transfer of the index of refraction modulation into a visible or near infrared image upon coherent mixing of the beam.

The gaseous medium is used to absorb the electromagnetic image. The electromagnetic image excites vibrational and/or rotational internal modes of the gas molecules. This causes local heating of the rotational and vibrational modes of the gas in direct proportion to the local amount of absorbed electromagnetic radiation at the corresponding point in the image. Vibrational-to-translational and rotational-to-translational energy exchanges occur during intermolecular collisions of the gas molecules. The local index of refraction variations attending the internal mode to translational energy exchange process are thus a direct mapping of the absorbed electromagnetic energy image.

An important aspect of the invention relates to the mixture of gases used in the gaseous medium to enhance the probability for molecular collision and consequently an exchange of internal (vibrational and/or rotational) energy for kinetic energy as listed in Tables 1 and 2. The energy exchange rate of lower energy modes, for example where the absorbing molecular species is rotationally excited by the radiation, can be enhanced by providing a gas mixture that includes the absorbing molecular species and a slower collider molecular species, such as argon or neon or as delineated in Table 3. The energy exchange rate of higher energy modes, for example, as in the case if the absorbing species is vibrationally excited by the radiation, can be enhanced by providing a gas mixture that includes the absorbing molecular species and a fast collider molecular species, such as helium or hydrogen.

By providing the electromagnetic imager with relatively strong absorbing gaseous species, such as $SF_6$ to image 10.6 micrometer infrared signals, or as delineated in Tables 1, 2 or 4 for other wavelengths of electromagnetic energy, this insures that the electromagnetic energy image is absorbed in the region just inside the surface of the input window of the interferometer where the image plane of the electromagnetic radiation image resides. Accordingly, most of the light results in a thermal image in the focal plane of the electromagnetic imaging lens in the gas, thus minimizing any blurring of the image due to further propagation of the light into the gas.

The duration of the molecular collision is also important in the energy exchange. An energy exchange can be enhanced if the duration of a molecular collision is relatively close to the period of the internal mode of the molecule being quenched by the collision. The duration of a collision affects the probability for the collision of inducing an energy exchange from a specific internal mode to translational energy of the molecules involved in the collision. The rate of molecular collision is also important to the optimum performance of the invention. There are approximately on the order of $10^{19}$ hydrogen molecule collisions per microsecond per cubic millimeter at room temperature and atmospheric pressure. The rate of collisions between more massive gaseous collision partners does not vary significantly from this estimate to appreciably affect the performance of the imaging system.

The vibrational to translational energy exchange probability depends on the details of the molecular collision. The quantum mechanical probability matrix element for such an exchange of energy is expressed in equation 1:

$$V_{1 \to 0}^2 = \frac{1}{2\gamma_k L^2} \sum_S A_1^2 \qquad (1)$$

where:

$\overline{A}_1$ is an averaged cartesian displacement of surface atom S, (that is being collided with), for unit change of the normal coordinate of the particular vibrational mode, L is a length parameter that characterizes the interaction, and $\gamma_k$ is a constant consisting of quantum mechanical factors.

The actual modeling of the vibrational to translational energy exchange rate requires what is known as a Monte Carlo type calculation in which the initial states (e.g., rotational state, orientation with respect to each other, impact parameter of collision and kinetic energy in the center of mass) of the colliding species are chosen from probability distributions. The calculation or other determination of the probability of energy exchange per collision is only one factor in the rate expression for such a process. The other factor is the rate of collisions between the species as shown in equation 2:

*Exchange Rate = Probability per Collision of Exchange × Collision Rate* (2.)

In order to evaluate equation 2, the initial state dependencies must be included such that the exchange rate can be calculated for each unique possibility. Such a calculation is cumbersome. However, equation (2) does show that the exchange rate increases with the collision rate. It is also known that the collision rate increases with pressure. Thus, in order to enhance the operation of the electromagnetic imager, the device may be operated at a higher pressure. The higher pressure, in turn, allows for higher collision rate among the molecules in the gaseous medium.

Figure 2:
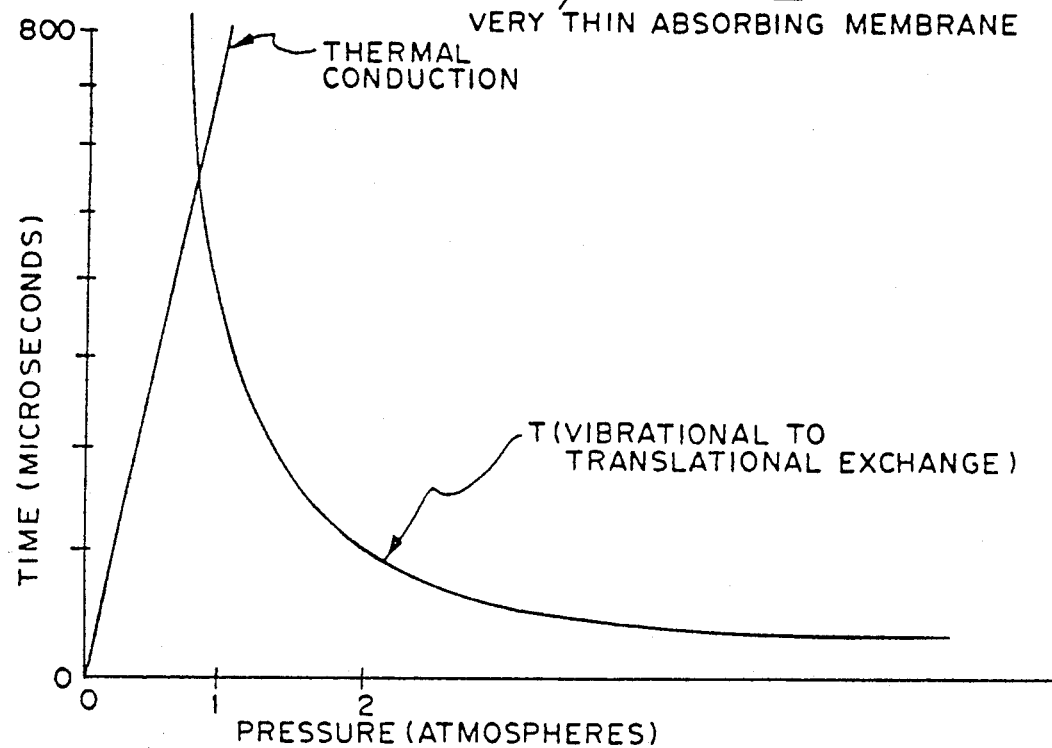
FIG. 2 is a diagram of time versus pressure illustrating temporal relationships between various phenomena which affect the performance of the electromagnetic imaging device.

Three benefits are derived from higher pressure operation. The first benefit, illustrated in FIG. 2, shows that the rate of internal vibrational-to-translational energy and/or rotational to translational energy exchange in the gaseous medium increases with increasing pressure.

This relationship improves the rise time response for the device. The second benefit is that since the collision of the molecules is more frequent in proportion to the pressure, the mean free path of the vibrationally excited molecule is attenuated in inverse proportion to the pressure. The shorter the mean free path for the excited molecules, the sharper the refractive index variations in response to the electromagnetic energy image absorption. The third benefit is that the absorption coefficient for the gaseous medium in which the electromagnetic energy is produced is increased linearly with increasing pressure. An increase in the absorption coefficient inversely proportionally decreases the absorption depth and therefore sharpens the resulting detected image.

It has been discovered that there has been a trade-off in increasing the pressure of the system to enhance the device performance. Specifically, the amplitude of the pressure fluctuations about the average pressure increase in proportion to the increase in pressure. These fluctuations occur throughout the entire gaseous volume and are as likely to be less than the average pressure as higher than the average pressure. Thus, the entire effect of increasing the pressure in the device is to improve the rise times and image sharpness but increase the system noise due to pressure fluctuations by a factor of $\sqrt{P}$ where P is relative increase in gas pressure.

The present invention provides for changing the gas mixture to a composition which permits alternative wavelengths of electromagnetic energy to be absorbed. This feature provides flexibility to end users since the device can be used interchangeably to image any wavelength at which an absorbing species can be determined.

An important consideration is that for relatively low power electromagnetic images, the electromagnetic imager can be modeled as a perfectly linear system. However, this presupposes that the heating rate of the gas is slower than the thermal diffusion or thermal conduction. As previously discussed, the rise time of a feature in the image plane of the electromagnetic imager depends on the molecular energy exchange rate and the thermal diffusion for the medium. If the molecular internal energy to kinetic energy exchange rate is faster than the thermal diffusion rate of the excited molecules out of the absorbing region, a steady state thermal distribution will be developed that produces an analogous steady state refractive index distribution in the gaseous medium in the region of the electromagnetic absorption that has the same spatial shape as the electromagnetic radiation image.

The fall time of the electromagnetic imager depends on the thermal diffusion and the thermal conduction of the medium in which the thermally induced refractive index variations reside. Thermal diffusion and thermal conduction in a gas or liquid is isotropic. The kinetically hot molecules are randomly transported throughout the medium. The medium will equalize to the quiescent temperature at distances that correspond to several diffusion lengths from the position at which the absorption of the radiation occurred.

The thermal transport equation that describes the performance of a region including absorbing gaseous species in the focal plane is given by equation 3

$$\nabla^2 T = \frac{1}{D} \frac{\partial T}{\partial t} - \frac{G}{K} \qquad (3)$$

where:

G is the heating rate source term, $$D = \frac{K}{\rho C},$$

K is the thermal conductivity of the medium,
ΔC is the specific heat per unit volume of the medium,
T is the local temperature of the medium, and
t is time.

At steady state, the time dependent term is set to zero leaving the following expression:

$$\nabla^2 T = -\frac{G}{K}. \qquad (4)$$

Equation 4 may then be used to calculate the thermal distribution that results from locally heating the gas in the focal plane. The steady state temperature distribution of a Gaussian spot in a gas is given by equation (5)

$$\Theta_O\left(\frac{r}{\delta} : \frac{2\gamma z}{\delta} : \gamma\right) = \qquad (5)$$

$$\frac{2\gamma}{\sqrt{\pi}} \int_0^\infty J_O\left(2\lambda \frac{r}{\delta}\right) e^{-\lambda^2} \times \left[\frac{\gamma e^{-\lambda \frac{2\gamma s}{\gamma \delta}} - \lambda e^{-\frac{2\gamma s}{\delta}}}{\gamma^2 - \lambda^2}\right] d\lambda$$

where:
δ:ε⁻² diameter of the Gaussian spot
γ:αδ/2, the ratio of the beam diameter to the absorption depth Such a spot volume has an index of refraction that differs from the bulk of the gas. This variation of the index of refraction is provided in equation 6.

$$\Delta n(r,z) = -(n-1)\left(\frac{\Delta T(r,z)}{T}\right) \qquad (6)$$

Equations 5 and 6 may be combined to yield equation 7.

$$\Delta n\left(\frac{r}{\delta} : \frac{2\gamma z}{\delta} : \gamma\right) = \qquad (7)$$

$$-(n-1)\frac{2\gamma}{\sqrt{\pi}} \int_0^\infty J_O\left(2\lambda \frac{r}{\delta}\right) e^{-\lambda^2} \times$$

$$\left[\frac{\gamma e^{-\lambda \frac{2\gamma s}{\gamma \delta}} - \lambda e^{-\frac{2\gamma s}{\delta}}}{\gamma^2 - \lambda^2}\right] d\lambda$$

Equation 7 may then be integrated twice over z to evaluate the optical path length for the laser light that passes through the gas to and from the electromagnetic imager input window.

The electromagnetic imager in accordance with the present invention utilizes interferometric detection techniques to produce an optical likeness of the index of refraction distribution in the focal plane that resides just inside the electromagnetic window. A laser beam is disposed so as to be incident upon the input aperture of the interferometer and split into two beams of nominally equal power. One of the beams is used as a reference beam against which to detect phase differences in the other beam. The optical path length of the reference beam is maintained as stable as possible and compare' with the optical path lengths of similar portions of the beam in the measured path. The optical path length of the laser light at various positions across the laser beam spot in the measurement beam is modulated by thermally induced index of refraction changes in the gaseous medium in a region just inside the imager input window. The phase of the light at the various positions across the beam is compared at a recombining beam splitter with the phase of light at an analogous position in the reference arm of the interferometer.

The interferometer has a large beam spot that includes the focal plane electromagnetic image in the interferometer measurement arm. The phase modulation of the measurement beam may be detected at the output in one of two ways. In the first way, a visible light detector array or a semi-transparent screen is illuminated by the output signal. When a screen is used, the image may be observed directly by human observation or through the use of a condensing lens which may be used to relay the image to the surface of an imaging device, such as a detector array, vidicon camera or other means by which an image can be detected or preserved. Both positive and negative images are produced. These images may be used together to improve the clarity of the image through further signal processing. As used herein, the term lens and lenses refer to a device whose physical properties, such as shape, reflectivity, refractivity and transmission are suitable for the wavelength of the electromagnetic energy from an object being imaged and/or a real image being relayed by the subject invention.

Another way to detect the phase modulation of the measurement laser beam is to allow the output signal to illuminate a Fourier transforming lens. A Fourier transforming lens produces a Fourier transform of the electromagnetic image in its own focal plane. This Fourier transform represents the spatial optical modulation of the electromagnetic image of interest.

As previously discussed, it is necessary to maintain the interferometer in its linear response region. A servo system may be used for this purpose. One way to maintain the interferometer in its linear response region is to utilize the total detected optical signal level from all detectors in an imaging array to adjust a laser wavelength so that the interferometer is maintained in a linear response region. If, for example, the vacuum optical path lengths in the interferometer arms differ by a known length, L, the required range of laser wavelength adjustment to maintain a linear response is given by the following expression:

$$\Delta \lambda_{LASER} = \frac{\lambda^2_{LASER}}{L}$$

The control system used to maintain the linear response of the interferometer causes adjustments to the laser wavelength to compensate for the electromagnetic imager's drift and jitter due to environmental variations.

Figure 3:
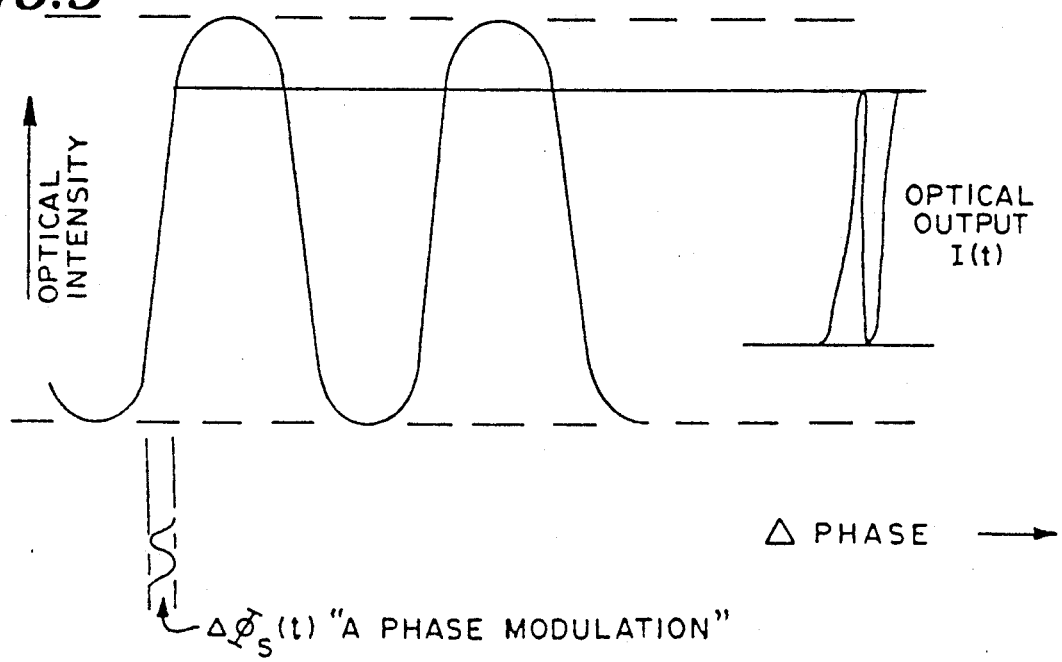
FIG. 3 is a diagram illustrating the response of a typical interferometer to a sinusoidally time varying phase shift.

FIG. 3 illustrates a diagram of the intensity as a function of optical phase difference for a typical laser illuminated interferometer. As shown from FIG. 3, the intensity of a point in the illuminated field at the output screen, illuminated by an interferometer, will vary with the phase shift induced by the refractive index variation in the gaseous medium. The spatial modulation of the refractive index across the focal plane in the gas maps to an optical intensity modulation across the interfered beams after the output couplers of an interferometer. This intensity can be detected directly by available visible or near infrared detector arrays or observed by a television camera focused to infinity.

The electromagnetic imager can also be used for microwave imaging at radar wavelengths through the use of suitably large imaging input optics having a short focal length. For example, if oxygen is used as the gaseous medium, it absorbs electromagnetic energy strongly at 60 gigahertz into a rotational internal mode. In such a system, a sufficiently large microwave lens or concave mirror is used to collect the 60 gigahertz microwave signal to focus it into a real image in the oxygen. The absorption of the microwave signal by the oxygen excites the internal rotational mode of the oxygen molecules. Upon collision with other molecules, the oxygen transfers the rotational energy into kinetic energy as heretofore described such that the local gas refractive index will decrease in response to the heating of the local kinetic modes. At frequencies other than 60 gigahertz, other gaseous species may be used for imaging these wavelengths.

Figure 4:
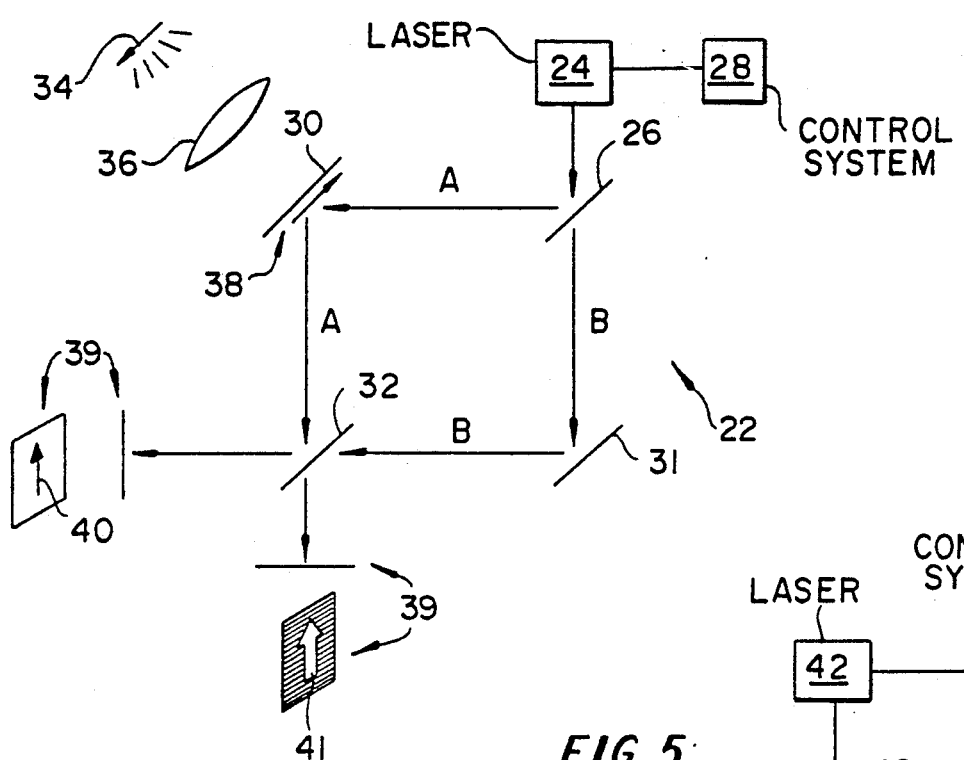
FIG. 4 is an optical schematic representation of the electromagnetic imager in accordance with the present invention using a Mach-Zehnder interferometer.

The principles of the present invention are capable of being practiced in various embodiments, all of which are intended to be covered by the scope of the appended claims. For example, FIG. 4 illustrates an electromagnetic imager in accordance with the present invention which utilizes a Mach-Zehnder interferometer 22. A laser 24 illuminates an input port 26 of the interferometer 22. The laser 24 is controlled to provide laser light at a wavelength at which the Mach-Zehnder interferometer 22 will be in its linear response region. The laser 24 is adjusted in response to a feedback signal from a control system 28. The control system 28 may be as previously described.

The light from the laser 24 is split into two nominally equal intense paths A and B. The beam along path A passes through the gaseous medium disposed within the interferometer 22. The beam A is reflected specularly from the electromagnetic image input window 30. The laser beam in path B passes through the gaseous medium and is reflected specularly from the mirror 31. The laser beam in path B is then input into a recombining beam splitter 32. If the electromagnetic image input window 30 has a real image from an electromagnetic energy-emitting object 34, imaged by an imaging relay lens 36 just inside the gaseous medium adjacent to the interior surface 38 of the interferometer 22, the laser beam along path A will be modulated in phase as it passes twice through the index of refraction pattern in the focal region. The beams from paths A and B are then interfered at the recombining beam splitter 32 producing two interfered beams which may be used to produce either a positive image 40 and a negative image 41 of the electromagnetic object at the screens 39.

Figure 5:
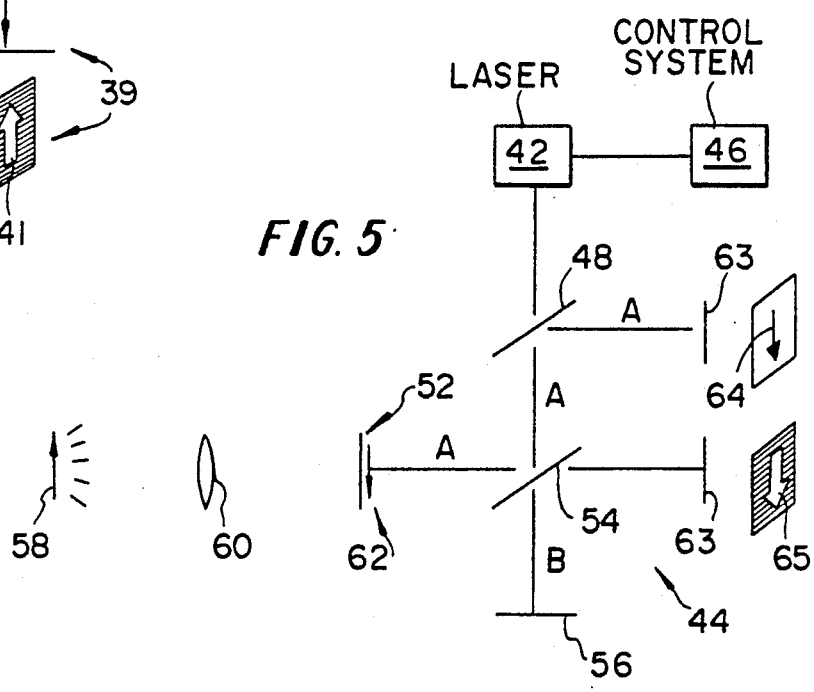
FIG. 5 is an optical schematic representation of the electromagnetic imager in accordance with the present invention using a Michelson interferometer.
Figure 6:
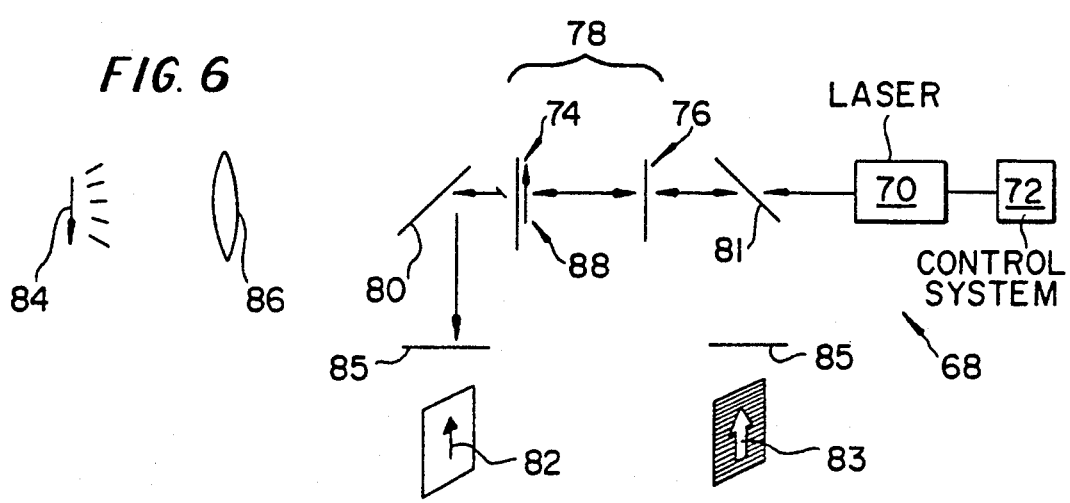
FIG. 6 is an optical schematic representation of the electromagnetic imager in accordance with the present invention using a Fabry-Perot interferometer.

In an alternate embodiment of the invention, a Michelson interferometer is used. This embodiment is illustrated in FIG. 5. In particular, a laser 42 with beam expanding optics, preferably with optical isolation, is controlled to provide laser light at a wavelength at which a Michelson interferometer 44, filled with a gaseous medium, is in its linear response region. The laser 42 is adjusted in response to a feedback signal from the control system 46 to maintain the interferometer 44 in its linear response region. The light beam from the laser 42 passes through a partial reflector 48 and illuminates an input port of the Michelson interferometer 44. The laser light from the laser 42 is split into two nominally equal intense paths A and B. The light beam along path A passes through the gas and is reflected specularly from an electromagnetic image input window 52. The laser beam in path A is input into a recombining beam splitter 54. The laser beam in path B passes through the gaseous medium and is reflected specularly from a mirror 56. If the electromagnetic image window 52 has a real image due to light from an electromagnetic energy-emitting object 58, imaged by an imaging relay lens apparatus 60 just inside the gaseous medium adjacent the interior surface 62 at a wavelength that is absorbed by the gaseous medium, the laser beam along path A is modulated in phase as it passes twice through the index of refraction pattern in the focal region. The beam from paths A and B are interfered at the recombining beam splitter 54, producing two interfered beams to produce positive 64 and negative images 65 at the screens 63 of the electromagnetic energy-emitting object.

In another alternative embodiment, a Fabry-Perot interferometer, filled with a useful gaseous medium, is used. A laser 70 with expanding optics, preferably with optical isolation, is controlled to provide laser light at a wavelength to maintain the Fabry-Perot interferometer 68 in its linear response region. Similar to the other interferometers, the laser 70 is adjusted in response to a feedback signal from a control system 72. The Fabry-Perot interferometer is comprised of an electromagnetic energy input window 74 and an input beam splitter 76. The laser light from the laser 70 illuminates the input beam splitter 76 of the interferometer 68. The laser light resonates in the Fabry-Perot resonator cavity 78. The beam transmitted through the electromagnetic energy input window 74 and reflected from a mirror 80 illuminates a screen 82 as a result of interference of the laser signals inside the resonator cavity 78. The beam transmitted through the beam splitter input coupler and reflected from the partial mirror 81 illuminates a screen 83 as a result of interference of laser signals inside the cavity 78. If the electromagnetic energy input window 74 has a real image, due to light from an electromagnetic emitting object 84, imaged by an imaging relay lens 86 to a location just inside the gaseous medium adjacent the interior surface 88 at a wavelength absorbed by the gas, the laser beams that are reflected from the input beam splitter 76 and transmitted through the electromagnetic window beam splitter are modulated in response to the index of refraction pattern in the focal region. This modulated signal produces positive 82 and negative images 83 of the electromagnetic object of the screens 85, respectively.

Figure 7:
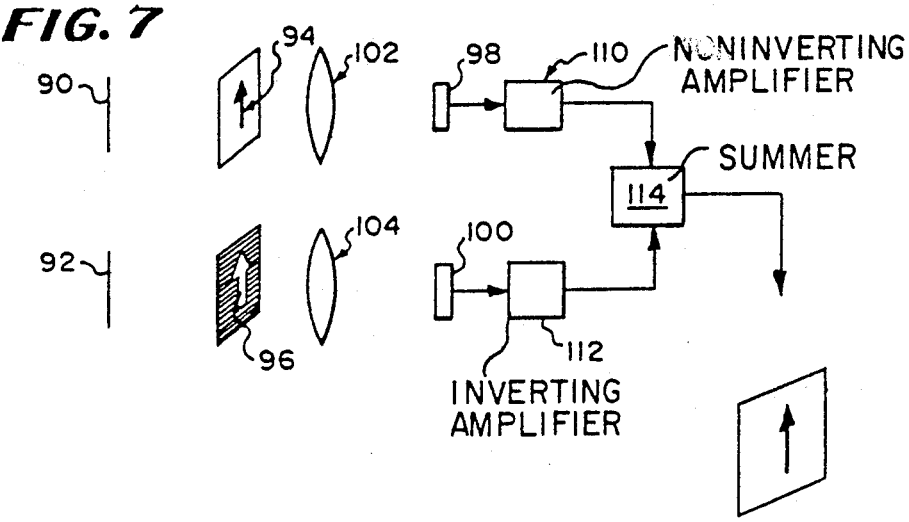
FIG. 7 is an optical schematic representation of the electromagnetic imager in accordance with the present invention illustrating image enhancement.

Various methods may be used to improve the signal-to-noise ratio of the interferometer of the output signals. One such method is shown in FIG. 7. In this method both the positive and negative images, produced at the interferometer output ports, are utilized to improve the signal to noise ratio of the output image. More specifically, the interferometers heretofore described are capable of producing a signal representative of an electromagnetic image just inside the electromagnetic image window at both of the interferometer output ports 90 and 92. The output ports 90 and 92 produces either a positive image 94 or a negative image 96.

There are several ways in which the output of the recombining beam splitter, such as elements 32 and 54, may be detected or formed into images for display. These means include direct illumination of a detector or detector array, such as elements 98 and 100, illumination of an intermediate screen, such as elements 90 and 92, which may be viewed directly or reimaged by suitable relay lenses, such as elements 102 and 104, illumination of suitable relay lenses without an intermediate screen; and other means known in the art. The illuminating laser radiation exiting a recombining beam splitter, such as elements 32 or 54, in all cases is colinear. If the colinear exit beam is detected or imaged directly, as shown for screens 90 and/or 92, the screens may be placed at various distances from said recombining beam splitter, where real images will be formed on screens 90 and 92, or on either of these screens alone. The real images thus formed on screens 90 and 92 will exhibit reciprocal brightness, that is, when the output of screen 90 is positive the output of screen 92 will be negative, and when the output of screen 90 is negative the output of screen 92 will be positive.

The signal projected onto detector arrays 98 and 100 may be less than optimal due to mechanical noise and optical misalignment. Also, since the laser light that enters the interferometer is not absorbed, this light must exit the interferometer at either of the two output ports 90 or 92. Accordingly, the intensity of the laser light at corresponding points in the positive and negative images 94 and 96, respectively, from the two ports 90 and 92 must sum to the intensity of the laser beam at the corresponding location in the laser beam if there were not the intervening interferometer apparatus. The signal from the detector array 98 is applied to a noninverting amplifier 110. The signal from the detector array 100 is applied to an inverting amplifier 112. The output signals from both the noninverting amplifier 110 and the inverting amplifier 112 are applied to a summer 114.

Since the negative image 96 is applied to the inverting amplifier 112, the output signal of the inverting amplifier 112 will represent a positive image. The signals from the amplifiers 110 and 112 that correspond to related points on the positive and negative images are then summed. The output of the summer 114 produces a positive image which results in a signal which is improved by having a better signal-to-noise ratio than either the positive image 94 or the negative image 96 produced at either of the interferometer output ports 90 or 92.

Figure 8:
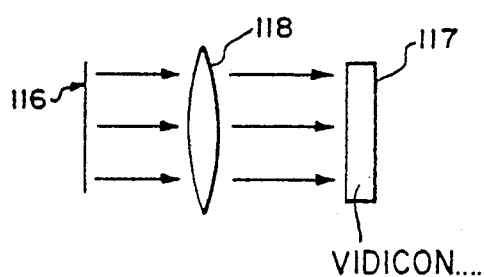
FIG. 8 is an optical schematic representation of the electromagnetic imager in accordance with the present invention using additional optical components to allow imaging using a vidicon tube, detector array or camera.

The electromagnetic imager in accordance with the present invention can be used to image electromagnetic images in the infrared millimeter wave and microwave wavelengths from either wave emitting or reflecting objects. By using additional optical components, such as lenses, the electromagnetic imager can be used to image such radiation into a vidicon tube, photoconductive detector array, camera or the like, as illustrated in FIG. 8. In FIG. 8, the laser light from an output port 116 of an interferometer is focused at infinity. If the laser light from the output port 116 were to illuminate a vidicon tube, camera or detector array 117 whose lenses 118 were focused to infinity, the image would be detected.

Figure 9:
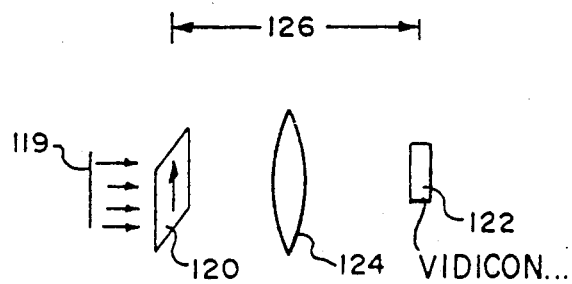
FIG. 9 is an optical schematic representation of the electromagnetic imager in accordance with the present invention, similar to FIG. 8, further including a screen.

In FIG. 9, laser light from an output port 119 of the electromagnetic imager is focused at infinity. If the laser light from the output port 119 were to illuminate a screen 120, the image on the screen 120 may then be imaged into a vidicon tube 122, detector array or camera having image relaying lenses 124 focused to a distance 126 from the screen 120.

Figure 10:
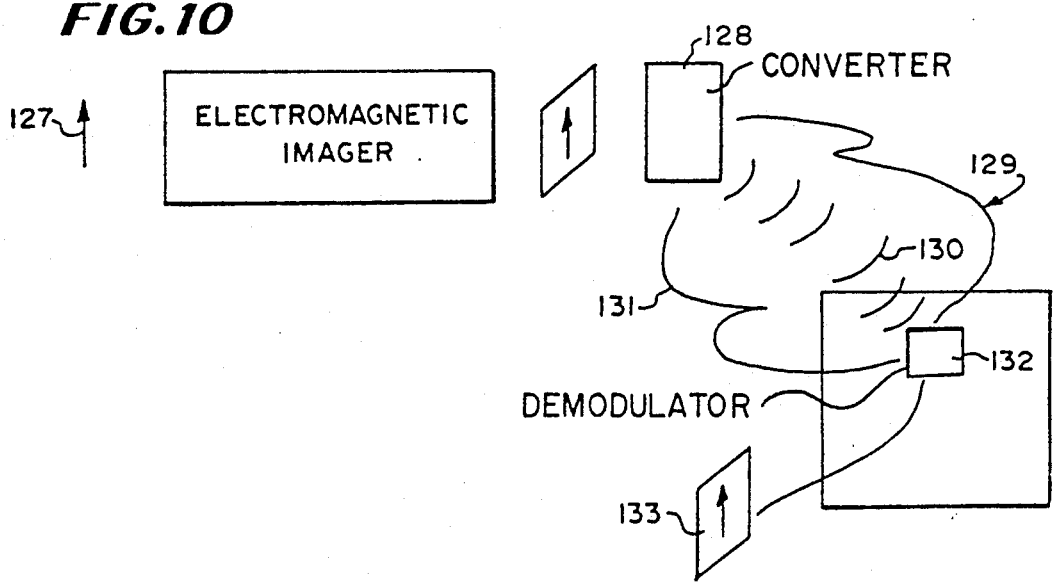
FIG. 10 is a schematic representation of an alternate embodiment of the electromagnetic imager in accordance with the present invention used to monitor objects or processes remotely.

In another embodiment of the present invention, illustrated in FIG. 10, the electromagnetic imager of the present invention may be used to monitor objects or processes 127 at a remote location. In this embodiment, a means 128 for converting the image from the electromagnetic imager to an electrical, radio frequency or optical signal that can be transmitted by wire 129, radio transmission 130 or optical wave guide 131 to the remote location where an appropriate demodulator 132 reproduces the image 127 produced by the electromagnetic imager onto screen 133.

In yet another embodiment, illustrated in FIG. 11, the electromagnetic imager in accordance with the present invention is used to detect the launch plume of land, sea or air launched ballistic missiles. In this embodiment, the electromagnetic imager 134 in accordance with the present invention is positioned on an appropriate platform 135 for unobstructed observation of the electromagnetic signal from a missile 136. The image of the launch plume 138 and other interesting features of the missile are detected by the electromagnetic imager 134 and applied to a computer 140 for additional analysis or transmission to other locations.

In another alternate embodiment, illustrated in FIG. 12, the electromagnetic imager in accordance with the present invention is used for the purpose of terrestrial surveillance from space for monitoring a planetary surface for intelligence gathering or terrestrial resource assessment such as assessments of crops, minerals, timber and for monitoring terrestrial and/or planetary surface temperatures and for observation of launch plumes for missiles. In this embodiment, the electromagnetic imager 142 is positioned on an appropriate platform 144 in space for unobstructed observation of the electromagnetic signals from the planetary surface 146. The electromagnetic image of crops, minerals, timber and other interesting features from the planet, such as terrestrial temperatures or launch plumes from missiles 148 can be detected by the electromagnetic imager 142 and input into instrumentation, such as a computer 146, for the purposes of analysis or transmission to other locations.

In another embodiment, illustrated in FIG. 13, the electromagnetic imager may be used as part of a night vision device. The preferred embodiment of the night vision device incorporates a Michelson interferometer but the principles of operation may also be used with a Mach-Zehnder or Fabry-Perot interferometer as discussed above. Referring to FIG. 13, a laser 150 with beam expanding optics, preferably with optical isolation, is controlled by a controller 152 to maintain the interferometer 154 in a linear response region. The light from the laser 150 illuminates a beam splitter 156, which splits the beam into two beams A and B of nominally equal power. The beam A illuminates and is reflected from the input window 158 of the interferometer 154 and has a real infrared image 160 of interesting infrared radiating or reflecting objects 162 that, by suitable relaying optics 164, to a position just inside the surface of the input window 158. The beam A illuminates the beam splitter 156. The beam B passes through the beam splitter 156 and is reflected specularly from a mirror 166 to illuminate the beam splitter 156. The beams A and B are then interfered in the beam splitter 156 and illuminate a screen 168 where the infrared scene may be observed by a human eye 169. A binocular version of this embodiment may be produced using two such embodiments, one for each eye.

The electromagnetic imager in accordance with the present invention may also be used as part of a color imaging system as illustrated in FIG. 14. In particular, two or more electromagnetic imagers 170, 172 and 174 may be used to observe the same electromagnetic scene 176. A first electromagnetic imager 170 is filled with a gaseous species mixture that is suitable for imaging at a first wavelength. A second electromagnetic imager 172 is filled with a gaseous species mixture suitable for imaging at a second wavelength. A third electromagnetic imager 174 is similarly filled with a gaseous species mixture suitable for imaging at a third wavelength.

In the discussion that follows, colors are cited merely to illustrate one embodiment of the present invention. However, it should be understood that any reference to a particular color is not intended to limit the invention to a particular color or number of colors. It is only necessary that more than one color be used and that the colors selected be distinguishable from one another. Each electromagnetic imager 170, 172, 174 has an additional electromagnetic bandpass filter 178, 180 and 182, respectively, to further restrict the wavelength of the electromagnetic radiation imaged in the focal region to the specific wavelength range of interest. The first electromagnetic imager 170 interfered optical signals output is observed by a vidicon tube television camera 184 and is stored as, for example, a red colorized image for display on a television monitor 186. The second electromagnetic imager 180 output signal is observed by a second vidicon tube television camera 188 and is stored as a blue colorized image for display on the television monitor 186. The third electromagnetic imager 174 output signal is observed by a third vidicon tube television camera 190 and is stored as a yellow colorized image for display on the television monitor 186. The resulting image 192 so constructed the television monitor is a colorized representation of the electromagnetic scene with the colors and location in the monitor image representing the various electromagnetic signals and their location in the scene.

Figure 15:
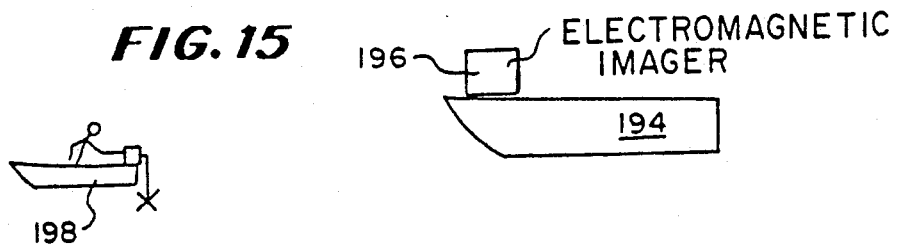
FIG. 15 is a schematic representation of an alternate embodiment of the electromagnetic imager in accordance with the present invention used on a water borne vessel.

The electromagnetic imager in accordance with the present invention may also be used on various types of vessels to provide imaging of interesting electromagnetic images. For example, as shown in FIG. 15, the electromagnetic imager may be used on a water borne vessel. More particularly, a ship 194 is provided with an electromagnetic imager 196 and associated instruments. The electromagnetic imager 196 is positioned aboard the ship 194 so as to provide an unobstructed view of interesting electromagnetic scenes 198.

Figure 16:
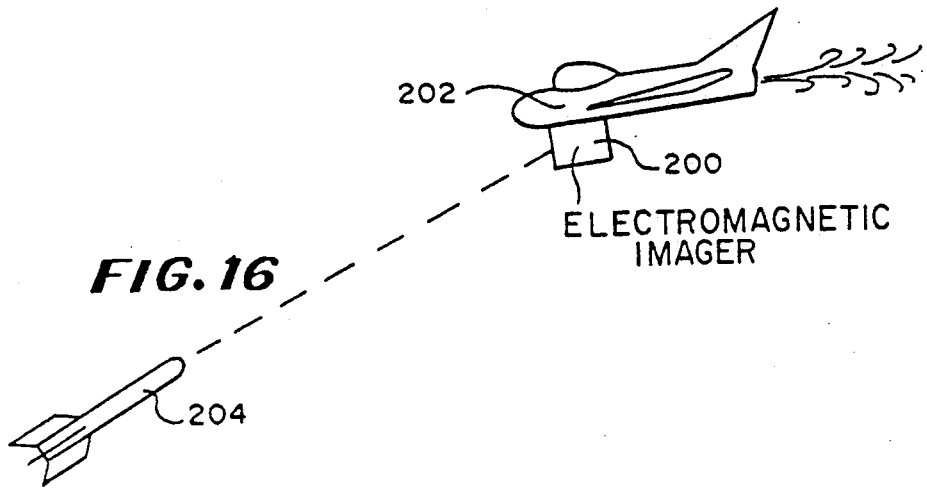
FIG. 16 is a schematic representation of an alternate embodiment of the electromagnetic imager in accordance with the present invention used on an airborne vessel.

The electromagnetic imager in accordance with the present invention may be used on airborne vessels as illustrated in FIG. 16. In this embodiment, the electromagnetic imager 200 is positioned on an aircraft 202 to provide an unobstructed view of interesting electromagnetic scenes 204, such as illustrated in FIG. 16.

Figure 17:
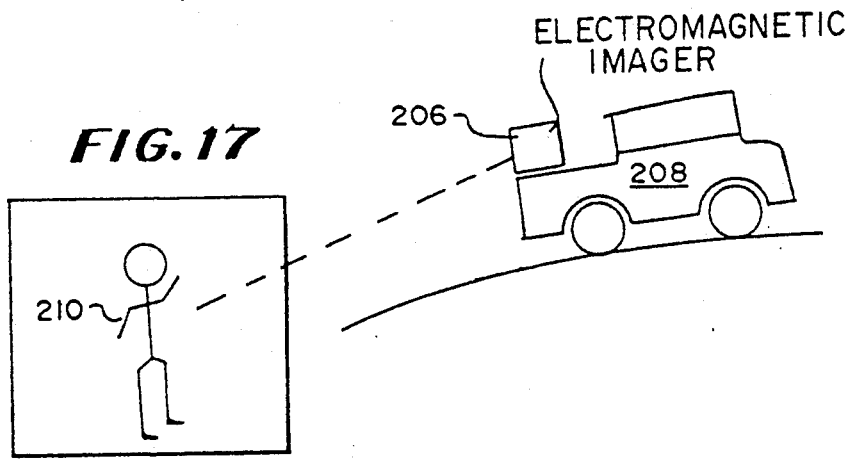
FIG. 17 is a schematic representation of an alternate embodiment of the electromagnetic imager in accordance with the present invention used on a land based vehicle.

The electromagnetic imager in accordance with the present invention may also be used on land based vehicles as shown in FIG. 17. In this embodiment, the electromagnetic imager 206 is positioned on land based vehicles 208 to provide an unobstructed view of interesting electromagnetic scenes 210.

Figure 18:
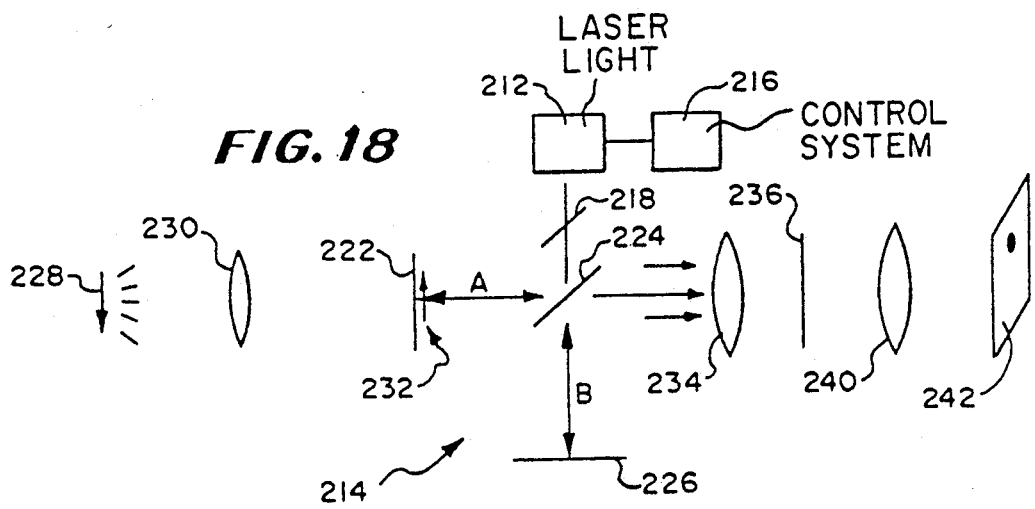
FIG. 18 is an optical schematic representation of an alternate embodiment of an electromagnetic imager in accordance with the present invention used as part of an optical analog computer.

The electromagnetic imager in accordance with the present invention may also be used with analog optical processing computers such that they may be used to process electromagnetic images at wavelengths up to now not viable. In such an application, the electromagnetic imager in accordance with the present invention can provide either of two possible inputs into an analog optical computer to provide a spatially modulated light input to the computer. It can provide the image from a semi-transparent screen for input to the analog optical computer. The computer can then use additional spatial light modulator filters to extract features from the input image for identifying objects in the image. This is illustrated in FIG. 18. In particular, a laser 212 with beam expanding optics, preferably with optical isolation, is controlled to provide laser light at a wavelength at which a Michelson interferometer 214 will operate linearly. The laser light 212 is adjusted in response to a feedback signal from a control system 216. The laser light 212 passes through a partial reflector 218 and illuminates an input port of a Michelson interferometer 214. The laser light is split into two nominally equally intense paths A and B. In one path, the light beam passes along path A, passes through the gaseous medium and is reflected specularly from the electromagnetic input window 222. The laser beam in path A is input into a recombining beam splitter 224. The laser beam in path B passes through the gas and is reflected specularly from a mirror 226. The light beam in path B is input into the recombining beam splitter 224. If the electromagnetic window 222 has a real image due to light from an electromagnetic emitting object 228, imaged by a relay lens apparatus face 232 at a wavelength that is absorbed by the gas, the laser beam along path A is modulated in phase as it passes twice through the index of refraction pattern in the focal region. The beams from paths A and B are then interfered at the recombining beam splitter 224 to produce two interfered beams that illuminates a Fourier transform lens 234 that produces the Fourier transform of the object. A matched spatial filter is placed at the location of the Fourier transform plane 236 that matches the Fourier transform of interesting of the scene. If the inverse Fourier transform is performed by another Fourier transform lens 240, the locations of the interesting features in the scene may be identified by relative locations of points of light in the resulting focal plane 242.

The electromagnetic imager in accordance with the present invention may also be used as a spatial light modulator for use in, for example, an optical image processing computer, which has the ability to reproduce the detected electromagnetic radiation image as a transparency to the light at the interferometer wavelength. This is illustrated in FIG. 19. More specifically, the spatial light modulator utilizes a Michelson interferometer 244. An input port 246 is illuminated by a laser 248 with optical isolation, having a suitable wavelength controller 249 for maintaining the interferometer in its linear response region. A thermal image 247 produced at an electromagnetic input window 250 as a result of electromagnetic energy absorbed from an interesting image 252 via a lens 256 produces colinear laser light which exits the output port 258 which possesses the spatial intensity modulation of the thermal image 247.

In another alternate embodiment, as illustrated in FIG. 20, an electromagnetic imager 260 in accordance with the present invention is positioned on a missile 262 to allow an unobstructed view of interesting targets 264. Signals from the electromagnetic imager 260 are fed to a computer 266 for analysis and to provide targeting, directional and fusing control for the missile. Information stored in the computer 266 can be used to permit a determination of the nature of the target and to permit fusing of the missile munition only in the event that the target 264 is determined to be hostile.

In another alternate embodiment of the present invention as illustrated in FIG. 21, a Fourier transform of an image can be directly observed on a screen. This embodiment is similar in operation to the embodiment illustrated in FIG. 18, with the exception of the omission of the lens 240 which is used to produce an inverse Fourier transform. In this embodiment, the Fourier transform of the image is observed on the screen 242 positioned at the Fourier transform plane.

The principles of the invention may be practiced with any interferometer that provides for the establishment of a real electromagnetic image in a medium included by one of the laser beams that can be caused to alter the index of refraction of the medium to the wavelength of the laser beam in response to the presence or absence of the electromagnetic signal. The topology of the system depends on the convenience and ease of use in the particular application. Gases are preferred since they most often demonstrate suitable vibrational to translational exchange rates at useful gas pressures and also have the required thermal conductivity and low heat capacity to optimize such a device for a situation where the electromagnetic signal is of sufficiently long duration. Thus, a gas is preferred as the imaging medium; however, it does not preclude the usefulness of a liquid or solid medium for such a purpose. In certain circumstances, it may be desirable to have a medium into which the real electromagnetic image is created that does not transport heat or in any other way respond to the loss of the electromagnetic signal by rapidly relaxing its index of refraction. Such a system is one where the probability of intercept is low and the events to be detected are brief. In such a system, the refresh signal that would be available from a continuous electromagnetic source is lacking and the medium needs to have a memory capability for a time duration in order to detect the event. If the scan rate for the detector array or vidicon is slow, the medium would need to have a memory of the brief event that is longer than the period of a single scan.

The preferred mechanism for altering the index of refraction of the medium in response to an infrared signal is the vibrational to translational energy exchange. However, this does not preclude the usefulness of other means to so alter the refractive index of the image in the medium, such as photorefractive or photochromic means or a means wherein a molecule, upon absorbing the electromagnetic energy, undergoes temporary and reversible transformation to a different conformation or species having band and substituent group differences from the molecules that have not absorbed the electromagnetic energy for a period of time, which is brief compared to the diffusion of the molecules out of the absorption region, such as a temperature dependent tautomerism or any other means wherein the medium index of refraction to the wavelength of the illuminating laser beam is altered in response to the presence of the interesting electromagnetic signal.

Thus, it should be apparent that an improved electromagnetic imager device has been disclosed which can record and reproduce electromagnetic images in the infrared, millimeter wave and microwave wavelengths onto various detection means, such as a vidicon camera or detection array. As illustrated the electromagnetic imager can be implemented in a number of ways and used in a variety of applications all of which are contemplated to be within the scope of the appended claims.

TABLE 1

Gases that are Suitable as IR Absorbers for Interferometric Detection of Infrared Images

| $\lambda:\mu$ | Species | Vib. Transition | Heat Capacity | Thermal Conductivity |
|---|---|---|---|---|
| 4.5 | CO | (0) → (1) | 29.0 J/mole °C. | $251 \times 10^{-6}$ W - cm/°C. |
| 15 | $CO_2$ | (000) → ($01^10$) | 36.6 J/mole °C. | $163 \times 10^{-6}$ W - cm/°C. |
| 7.2 | $CO_2$ | (000) → (100) | 36.6 J/mole °C. | $163 \times 10^{-6}$ W - cm/°C. |
| 4.5 | $N_2O$ | (000) → (001) | | $259 \times 10^{-6}$ W - cm/°C. |
| 14 | HCN | (000) → ($01^10$) | | $130 \times 10^{-6}$ W - cm/°C. |
| 15.4 | $NO_2$ | (000) → (010) | 37.0 J/mole °C. | $171 \times 10^{-6}$ W - cm/°C. |
| 6.16 | $NO_2$ | (000) → (001) | 37.0 J/mole °C. | $171 \times 10^{-6}$ W - cm/°C. |
| 7.75 | $H_2S$ | (000) → (010) | 36.1 J/mole °C. | $155 \times 10^{-6}$ W - cm/°C. |
| 9.17 | HDS | (000) → (010) | 36.1 J/mole °C. | $155 \times 10^{-6}$ W - cm/°C. |
| 8.57 | $H_2CO$ | (000000) → (000001) | | |
| 7.81 | $H_2CO$ | (000000) → (000010) | | |
| 6.65 | $H_2CO$ | (000000) → (001000) | | |
| 5.74 | $H_2CO$ | (000000) → (010000) | | |
| 3.60 | $H_2CO$ | (000000) → (100000) | | |
| 3.50 | $H_2CO$ | (000000) → (000100) | | |

TABLE 2

Gases that are Suitable as Far Infrared, and Microwave Absorbers for Interferometric Detection of Electromagnetic Images

| $v$:GHz | Species | Rot. Transition |
|---|---|---|
| 9.423 | HCN | J = 6 → 7, L doubling |
| 16.147 | HCN | J = 8 → 9, L doubling |
| 20.181 | HCN | J = 9 → 10, L doubling |
| 24.325 | OCS | J = 0 → 1, ($00^00$), L doubling |
| 24.368 | OCS | J = 0 → 1, ($01^10$), L doubling |
| 596 | $NH_3$ | J = 0 → 1 |
| 267 | $PH_3$ | J = 0 → 1 |
| 15.6 | $PF_3$ | J = 0 → 1 |
| 176 | $SbH_3$ | J = 0 → 1 |
| 51 | $CH_3F$ | J = 0 → 1 |
| 26.6 | $CH_3Cl$ | J = 0 → 1 |
| 19 | $CH_3Br$ | J = 0 → 1 |
| 15 | $CH_3I$ | J = 0 → 1 |
| 3 | $PCl_3S$ | J = 0 → 1 |

TABLE 3

Heavy Species That May Be Used As Slow Collider Species $BH_2$, $AlH_2$, $H_2S$, $H_2Se$, $H_2Te$, HCN, HCP, HNO, HPO, HCF, HCCl, HSiCl, HSiBr, $N_2O$, $CO_2$, OCS, $NO_2$, $NH_3$, $PH_3$, $C_2H_2$, $PF_3$, $PCl_3$, $PBr_3$, $CH_4$, $CH_3F$, $CH_3Cl$, $CH_3Br$, $CH_3Br$, $CH_3I$, $H_2CCO$, $H_2CN_2$, HCOOH, $CH_2F_2$, $CH_2Cl_2$, $CH_2I_2$, $CHF_3$, $CHF_3$, $CHCL_3$, $CHBr_3$, $CHI_3$,, $CF_4$, $CCL_4$, $CBr_4$, $CI_4$, $CF_3I$, $CCl_2F_2$, $POCl_3$, $CrO_2Cl_2$, $TiCl_4$, $TiBr_4$, $VCl_4$, $C_2H_4$, $N_2H_4$, $CH_3OH$, $CH_3SH$, $CH_3CN$, $CH_3NO$, $C_2H_3Cl$, $MoF_6$, $WF_6$, $UF_6$, $ReF_6$, $OsF_6$, $IrF_6$, $PtF_6$, $PuF_6$, $NpF_6$, $B_2H_6$, $C_2H_6$, $Si_2H_6$, $CH_2CHCH_2$, $C_2H_5Cl$, $C_2H_5Br$, $C_2H_5I$, $Zn(CH_3)_2$, $Cd(CH_3)_2$, $Hg(CH_3)_2S(CH_3)_2$, $AsF_3$, $AsCl_3$, $AsD_3$, $AsH_2D$, pentaborane, BrCl, BrCs, BrF, $SiBrF_3$, $BrGeH_3$, $BrH_3Si$, KBr, LiBr, NaBr, RbBr, CBrN, $CF_3Cl$, $CF_3Br$, $CClF_3$, CClN, phosgene, HCNO, HNCS, $CH_2Br_2$, $CH_2O_2$, $BH_3CO$, $CH_3BrHq$, $CH_3ClHq$, $CH_3SiCl_3$, $CH_3SiF_3$, $CH_3SiH_3$, $CH_3SnHe$, $CH_3HqI$, $CH_3NO_2$, $CH_4$), $CH_4S$, $CH_3NH_2$, ICN, CO, $COF_2$, OCSe, CS, $CSF_8$, SCSe, SCTe, $CF_3CN$, $C_2HCl$, $C_2H_2ClF$, $CF_2CH_2$, $C_2H_3Br$, $CH_3CCl_3$, $C_3H_3I$, $CH_3NC$, $CH_3NCS$, $CH_3SCN$, $CH_3CHF_2$, $C_2H_4O$, $C_2H_4S$, $C_2H_5N$, $CF_3CCH$, HCCCN, $C_3H_3Br$, $H_3CCCI$, $C_3H_3N$, $CH_3CCH$, $C_3H_5Cl$, $(CH_3)_2CO$, $C_3H_6O_3$, $C_3H_9ClSi$, $C_3H_9FlSi$ $P(CN)_3$, $C_4H_4$, $C_4H_4O$, $C_4H_5N$, $C_4H_9Br$, CsCl, Bromobenzene, Chlorobenzene, Fluorobenzene, $(CH_3)_3CBr$, $(CH_3)_3CI$, $(CH_3)_3CCl$, FCl, $ClF_3$, $CF_3Ge$, $CF_3Si$, $GeH_3Cl$, ICl, KCl, NaCl, NOCl, RbCl, $ReO_3Cl$, TlCl, $GeClH_3$, $GeCl_3H$, $GeCl_2H_2$, $SiClH_3$, $SiCl_3H$, $SiCl_2H_2$, $POCl_3$, $PSCl_3$, $SbCl_3$, CsF, CsI, $SiH_3F$, $SiF_3H$, $SiH_2F_2$, LiF, $MnO_3F$, NOF, $FReO_3$, $F_2OS$, $F_2SO_2$, $NF_3$, $POF_3$, $PSF_3$, $PF_3$, HBr, $PH_3$, NO, $O_2$, $SO_2$

TABLE 4

Species That Are Useful For Absorption Of Interesting Electromagnetic Images $BH_2$, $AlH_2$, $H_2S$, $H_2Se$, $H_2Te$, HCN, HCP, HNO, HPO, HCF, HCCl, HSiCl, HSiBr, $N_2O$, $CO_2$, OCS, $NO_2$, $NH_3$, $PH_3$, $C_2H_2$, $PF_3$, $PCl_3$, $PBr_3$, $CH_4$, $CH_3F$, $CH_3Cl$, $CH_3Br$, $CH_3Br$, $CH_3I$, $H_2CCO$, $H_2CN_2$, HCOOH, $CH_2F_2$, $CH_2Cl_2$, $CH_2I_2$, $CHF_3$, $CHF_3$, $CHCL_3$, $CHBr_3$, $CHI_3$, $CF_4$, $CCL_4$, $CBr_4$, $CI_4$, $CF_3I$, $CCl_2F_2$, $POCl_3$, $CrO_2Cl_2$, $TiCl_4$, $TiBr_4$, $VCl_4$, $C_2H_4$, $N_2H_4$, $CH_3OH$, $CH_3SH$, $CH_3CN$, $CH_3NO$, $C_2H_3Cl$, $MoF_6$, $WF_6$, $UF_6$, $ReF_6$, $OsF_6$, $IrF_6$, $PtF_6$, $PuF_6$, $NpF_6$, $B_2H_6$, $C_2H_6$, $Si_2H_6$, $CH_2CHCH_2$, $C_2H_5Cl$, $C_2H_5Br$, $C_2H_5I$, $Zn(CH_3)_2$, $Cd(CH_3)_2$, $Hg(CH_3)_2S(CH_3)_2$, $AsF_3$, $AsCl_3$, $AsD_3$, $AsH_2D$, pentaborane, BrCl, BrCs, BrF, $SiBrF_3$, $BrGeH_3$, $BrH_3Si$, KBr, LiBr, NaBr, RbBr, CBrN, $CF_3Cl$, $CF_3Br$, $CClF_3$, CClN, phosgene, HCNO, HNCS, $CH_2Br_2$, $CH_2O_2$, $BH_3CO$, $CH_3BrHq$, $CH_3ClHq$, $CH_3SiCl_3$, $CH_3SiF_3$, $CH_3SiH_3$, $CH_3SnHe$, $CH_3HqI$, $CH_3NO_2$, $CH_4$), $CH_4S$, $CH_3NH_2$, ICN, CO, $COF_2$, OCSe, CS, $CSF_8$, SCSe, SCTe, $CF_3CN$, $C_2HCl$, $C_2H_2ClF$, $CF_2CH_2$, $C_2H_3Br$, $CH_3CCl_3$, $C_3H_3I$, $CH_3NC$, $CH_3NCS$, $CH_3SCN$, $CH_3CHF_2$, $C_2H_4O$, $C_2H_4S$, $C_2H_5N$, $CF_3CCH$, HCCCN, $C_3H_3Br$, $H_3CCCI$, $C_3H_3N$, $CH_3CCH$, $C_3H_5Cl$, $(CH_3)_2CO$, $C_3H_6O_3$, $C_3H_9ClSi$, $C_3H_9FlSi$ $P(CN)_3$, $C_4H_4$, $C_4H_4O$, $C_4H_5N$, $C_4H_9Br$, CsCl, Bromobenzene, Chlorobenzene, Fluorobenzene, $(CH_3)_3CBr$, $(CH_3)_3CI$, $(CH_3)_3CCl$, FCl, $ClF_3$, $CF_3Ge$, $CF_3Si$, $GeH_3Cl$, ICl, KCl, NaCl, NOCl, RbCl, $ReO_3Cl$, TlCl, $GeClH_3$, $GeCl_3H$, $GeCl_2H_2$, $SiClH_3$, $SiCl_3H$, $SiCl_2H_2$, $POCl_3$, $PSCl_3$, $SbCl_3$, CsF, CsI, $SiH_3F$, $SiF_3H$, $SiH_2F_2$, LiF, $MnO_3F$, NOF, $FReO_3$, $F_2OS$, $F_2SO_2$, $NF_3$, $POF_3$, $PSF_3$, $PF_3$, HBr, $PH_3$, NO, $O_2$, $SO_2$

What is claimed and desired to be secured by a Letters Patent of the United States is:

1. A method of converting real images of a predetermined range of electromagnetic frequencies to a variation of the index of refraction of predetermined fluid media in a focal plane within said media by disposing an electromagnetic image in a predetermined fluid medium to allow electromagnetic radiation from the image to be absorbed by the medium by direct mapping into the medium in proportion to the local amount of electromagnetic radiation absorbed from corresponding points in the image resulting from excitation of internal molecular energy modes of the molecular species causing a variation of the index of refraction of the medium in the focal plane corresponding to the image, said method including the steps of containing said fluid media in an interferometer, and passing a laser beam through said fluid media.

2. An electromagnetic imager for converting real images of a predetermined range of electromagnetic frequencies to a variation of the index of refraction of predetermined fluid media in a focal plane within said media comprising: a predetermined fluid medium; and means for disposing an electromagnetic image in said predetermined medium and allowing electromagnetic radiation from the image to be absorbed by the medium by direct mapping into the medium in proportion to the local amount of electromagnetic radiation absorbed from corresponding points in the image resulting from excitation of internal molecular energy modes of the molecular species causing a variation of the index of refraction of the medium in the focal plane corresponding to the image, said electromagnetic imager including an interferometer, and said fluid medium being disposed in at least a portion of said interferometer.

3. An electromagnetic imager as recited in claim 2, wherein the predetermined medium is a liquid medium.

4. An electromagnetic imager as recited in claim 2, wherein said predetermined medium is a gaseous medium.

5. An electromagnetic imager as recited in claim 2, wherein said predetermined range of electromagnetic frequencies includes radiation in the infrared portion of the electromagnetic spectrum.

6. An electromagnetic imager as recited in claim 2, wherein said predetermined range of electromagnetic frequencies includes radiation in the millimeter wave portion of the electromagnetic spectrum.

7. An electromagnetic imager as recited in claim 2, wherein said predetermined range of electromagnetic frequencies includes radiation in the microwave portion of the electromagnetic spectrum.

8. An electromagnetic imager as recited in claim 2, wherein said interferometer is a Mach-Zehnder interferometer.

9. An electromagnetic imager as recited in claim 2, wherein said interferometer is a Michelson interferometer.

10. An electromagnetic imager as recited in claim 2, wherein said interferometer is a Fabry-Perot interferometer.

11. An electromagnetic imager comprising: a fluid medium; and means for converting real images at a predetermined electromagnetic wavelength to a variation of the refractive index of the medium in the focal plane of the medium in direct correspondence to the real image, said electromagnetic imager including an interferometer, and said fluid medium being disposed in at least a portion of said interferometer.

12. A device for converting real images of a predetermined range of electromagnetic frequencies to a variation of the index of refraction of predetermined mediums in the focal plane of the medium comprising: a predetermined medium; and means for disposing an electromagnetic image proximate said predetermined medium and allowing electromagnetic radiation from the image to be absorbed by the medium by direct mapping into the medium in proportion to the local amount of electromagnetic radiation absorbed from corresponding points in the image resulting from excitation of internal molecular energy modes of the molecular species causing a variation of the index of refraction in the focal plane of the medium corresponding to the image, and means for enhancing the probability of energy exchange upon molecular collisions.

13. A device as recited in claim 12, wherein said enhancing means includes a gaseous mixture that includes an absorbing molecular species and a collider molecular species.

14. A device as recited in claim 13, wherein said collider species is a slow collider species.

15. A device as recited in claim 14 wherein said slow collider species is selected from the group consisting of argon and neon.

16. A device as recited in claim 14, wherein said collider species is a fast collider species.

17. A device as recited in claim 16, wherein said fast collider species is selected from the group consisting of helium and hydrogen.

18. A device as recited in claim 13, wherein said absorbing molecular species is $SF_6$.

19. A device as recited in claim 12, wherein said enhancing means includes means for increasing the pressure of said medium.

20. A device as recited in claim 13, wherein said absorbing molecular species is oxygen.

21. A device as recited in claim 13, wherein said absorbing molecular species is selected from the group consisting of carbon monoxide, carbon dioxide, dinitrogen oxide, hydrogen cyanide, nitrous oxide, hydrogen sulfide, hydrogen deuterium sulfide or formaldehyde.

22. A device as recited in claim 13, wherein said absorbing molecular species is selected from the group consisting of hydrogen cyanide, ammonia, phosphine, trifluorophine, stibine, methyl flouride, methyl chloride, methyl bromide, methyl iodide, carbon oxysulfide or phosphorotrichloridothioate.

23. An electromagnetic imager comprising: an interferometer having a portion thereof filled with a fluid medium for absorbing electromagnetic radiation including an electromagnetic radiation input window for receiving laser light from a laser; control means for maintaining said laser proximate its linear response region; a beam splitter for splitting the laser light into two paths A and B of relatively equal intensity, a recombining beam splitter and at least one output port; said fluid medium being selected for absorbing electromagnetic radiation in a predetermined range of frequencies; wherein radiation from said electromagnetic image of interest is absorbed by said medium causing variation in the index of refraction proximate the focal plane of said fluid medium corresponding to said electromagnetic image.

24. An electromagnetic imager as recited in claim 23, wherein said interferometer is a Mach-Zehnder interferometer.

25. An electromagnetic imager as recited in claim 23, wherein said medium is a gaseous medium.

26. An electromagnetic imager as recited in claim 23, wherein said interferometer is a Michelson interferometer.

27. An electromagnetic imager as recited in claim 23, wherein said interferometer is a Fabry-Perot interferometer.

28. An electromagnetic imager comprising: an interferometer filled with a gaseous medium for absorbing electromagnetic radiation including an electromagnetic input window for receiving an electromagnetic image; an input port for receiving laser light from a laser; control means for maintaining said laser in its linear response region; a beam splitter for splitting the laser light into two paths A and B of relatively equal intensity, a recombining beam splitter and one or more output ports; said interferometer filled with a medium for absorbing electromagnetic radiation in a predetermined range of frequencies; wherein radiation from said electromagnetic image of interest is absorbed by said medium causing variations in the index of refraction in the focal plane of the gaseous medium corresponding to said electromagnetic image, wherein said interferometer is provided with two output ports.

29. An electromagnetic imager as recited in claim 28, wherein a positive image is produced at one output port and a negative image at the other output port.

30. An electromagnetic imager as recited in claim 29, wherein said output port, containing said positive image, illuminates a first detector array through a first relay lens and said output port, containing said negative image, illuminates a second detector array through a second relay lens; said first detector array coupled to a non-inverting amplifier and said second detector array coupled to an inverting amplifier; the outputs of said amplifiers coupled to a summing amplifier.

31. An electromagnetic imager as recited in claim 23, further including means for detecting said real image.

32. An electromagnetic imager as recited in claim 31, wherein said detecting means includes a vidicon tube.

33. An electromagnetic imager as recited in claim 31, wherein said detecting means includes a detector array.

34. An electromagnetic imager as recited in claim 31, wherein said detecting means includes a camera.

35. An electromagnetic imager as recited in claim 23, further including a screen in communication with said output port of said interferometer; wherein said real image is on said screen.

36. An electromagnetic imager as recited in claim 35, further including means for detecting said real image.

37. An electromagnetic imager as recited in claim 35, wherein said detecting means includes a vidicon tube.

38. An electromagnetic imager as recited in claim 35, wherein said detecting means includes a detector array.

39. An electromagnetic imager as recited in claim 35, wherein said detecting means includes a camera.

40. A night vision device comprising an interferometer filled with a fluid medium for absorbing electromagnetic radiation having an electromagnetic image input window, an input port for receiving laser light from a laser, a beam splitter for splitting the laser light into two paths A and B of relatively equal intensity, an output port nd a screen disposed adjacent said output port, wherein any electromagnetic image in said predetermined frequency range applied to said electromagnetic image input window will be displayed on said screen and observable by a human eye.

41. A night vision device as recited in claim 40, further including relaying optics disposed adjacent said electromagnetic image input window.

42. A night vision device as recited in claim 40, further including means for maintaining said interferometer in its linear response region.

43. A night vision device as recited in claim 40, wherein said electromagnetic radiation absorbing medium is a gaseous medium having a fixed volume.

44. A night vision device as recited in claim 40, wherein said predetermined frequency range includes the infrared frequency range.

45. A device for imaging electromagnetic radiation in a predetermined frequency range into an analog optical computer comprising:

a laser;

an interferometer including an electromagnetic image receiving window for receiving an electromagnetic image from an input port for receiving laser light from said laser and an output port; said interferometer filled with a fluid medium for absorbing electromagnetic radiation in a predetermined frequency range;

a Fourier transform lens disposed adjacent said output port for producing a Fourier transform of the image; and an inverse Fourier transform lens disposed adjacent said Fourier transform lens for providing an input signal to an optical analog computer.

46. A device as recited in claim 45, wherein said electromagnetic radiation frequency range includes the infrared frequency range.

47. A device as recited in claim 45, wherein said electromagnetic frequency range includes the millimeter wave frequency range.

48. A device as recited in claim 45, wherein said electromagnetic frequency range includes the microwave frequency range.

49. A device as recited in claim 45, further including a matched spatial filter, disposed at the focal plane of said Fourier transform lens.

50. A device as recited in claim 45, further including a relay lens disposed adjacent said electromagnetic energy input window.

51. A device as recited in claim 45, further including control means for maintaining said interferometer in its linear response region.

52. A device as recited in claim 45, wherein said medium includes a gaseous mixture.

* * * * *